Sept. 18, 1956     C. M. PERKINS ET AL     2,763,290
PRESELECTABLE VALVE ACTUATOR Filed Jan. 31, 1955                                                    3 Sheets—Sheet 1

INVENTORS
CHARLES M. PERKINS
BY PETER J. VISSER

ATTORNEY

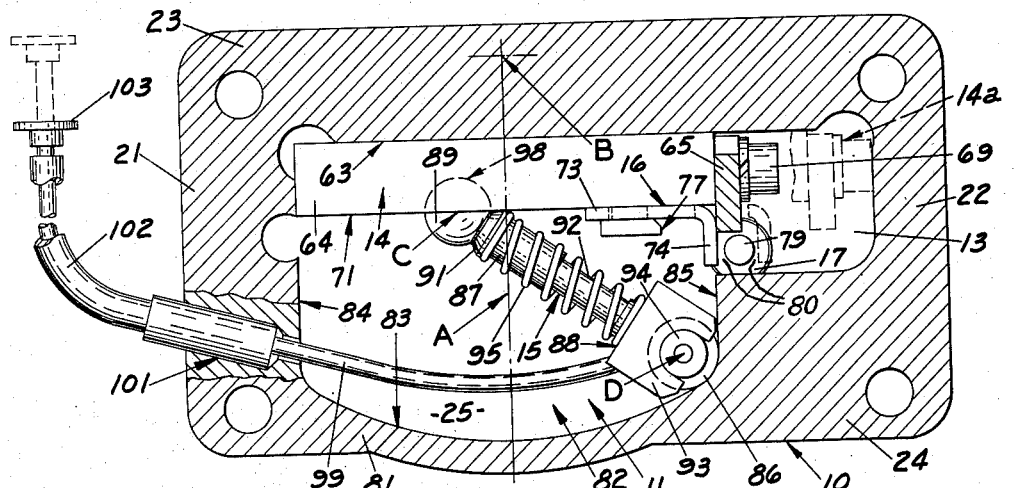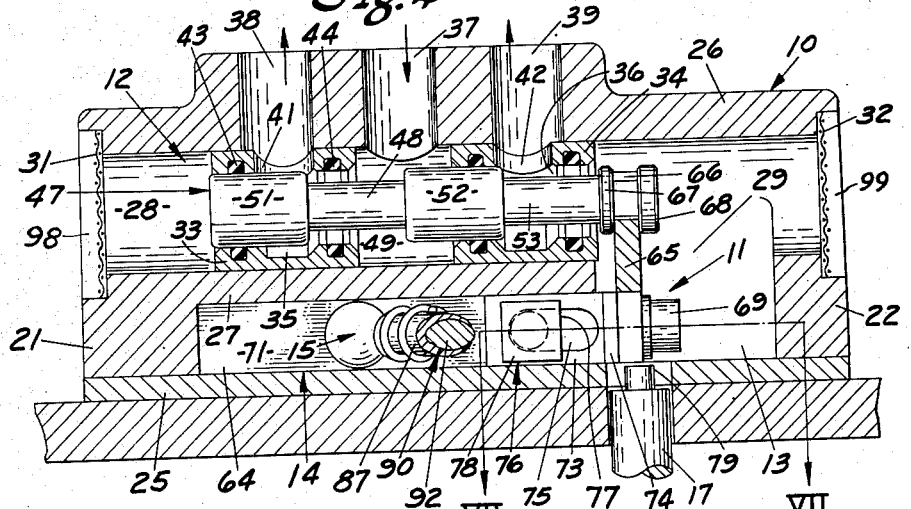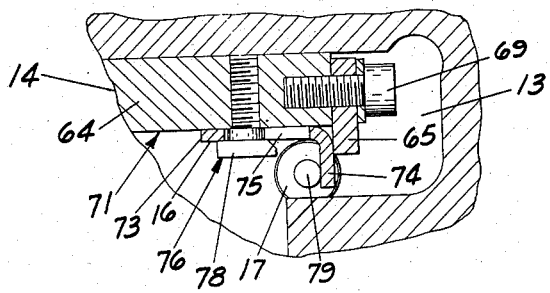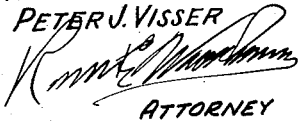

Sept. 18, 1956     C. M. PERKINS ET AL     2,763,290
PRESELECTABLE VALVE ACTUATOR Filed Jan. 31, 1955     3 Sheets-Sheet 3

INVENTORS
CHARLES M. PERKINS
BY PETER J. VISSER

ATTORNEY

United States Patent Office 2,763,290
Patented Sept. 18, 1956

2,763,290

PRESELECTABLE VALVE ACTUATOR

Charles M. Perkins, Kalamazoo, and Peter J. Visser, Kalamazoo Township, Kalamazoo County, Mich., assignors to Fuller Manufacturing Company, a corporation of Delaware Application January 31, 1955, Serial No. 485,207

17 Claims. (Cl. 137—622)

This invention relates in general to a preselectable, mechanical actuating device and more particularly to a type thereof designed to actuate automatically a piston type valve upon operation of an interconnected, but otherwise independent, shift mechanism of a transmission.

The advantages of an actuating device, as for a valve, which can be cocked or otherwise energized in advance and then automatically released upon occurrence of another event or operation are many and well known. Such a device is disclosed in Patent No. 2,637,222, issued to Thomas Backus, wherein the shift controlling valve for auxiliary transmission is moved in response to movements of the shift rods of the main transmission acting through a combination electrical and fluid pressure system. However, in some transmission applications, a wholly mechanical valve controlling device is preferable to a partially electrical device for reasons which vary with the use but usually include economy of manufacture, ease of maintenance and positiveness in operation.

Further, it has been discovered that the shifting of an auxiliary transmission in association with a main transmission, which auxiliary shifting is effected by a fluid pressure responsive cylinder and so actuated in response to occurrence of manual preselection followed by attainment of a predetermined position by the main transmission, is greatly facilitated if both sides of the said power cylinder are connected to the side opposite the source of fluid pressure differential, as the atmosphere in the case of either a vacuum system or some types of compressed air systems, at some time prior to the actual admission of fluid pressure into the power cylinder for effecting a shift of the auxiliary transmission. Therefore, it is desirable to provide a valve which will move in response to said manual preselection a limited distance for connecting both sides of the pressure cylinder to the atmosphere and will then automatically upon the attainment by the main transmission of its predetermined position move under the urging of a mechanical force a further distance to effect a shifting of the valve and consequent conduction of pressure fluid into a desired end of the pressure cylinder and thereby effecting a shift of the auxiliary transmission in a desired direction.

Accordingly, a primary object of this invention has been the provision of a completely mechanically operated actuating device which can be preselectively cocked or energized for the purpose of operating automatically upon the the occurrence of an outside event in a predetermined manner, said event being otherwise independent of said device.

A further object of this invention is the provision of an actuating device, as aforesaid, which will remain inoperable unless it is preselectably cocked or energized, which can be left in the cocked position indefinitely if said event does not occur, and which will operate almost instantaneously upon the occurrence of said event if cocked any time prior to such occurrence.

A further object of this invention is the provision of a preselectable actuating device, as aforesaid, which can be used in conjunction with a piston type valve for controlling the flow of fluid under pressure through said valve to a fluid pressure responsive actuator, which device will operate positively, quickly and unfailingly in response to the occurrence of a remotely controlled event, such as the shift of an engine transmission, communicated to said device through appropriate mechanical linkage or control mechanism.

A further object of the invention is to provide a valve actuator which will move a limited distance in response to the valve cocking event, which will be arrested after such movement through said limited distance and will then automatically move the balance of its distance of operation immediately upon occurrence of another event.

A further object of the invention is to provide a device, as aforesaid, which will move a limited distance in response to the valve cocking event, which will be arrested after such movement through said limited distance and will then be automatically moved the balance of its distance of operation immediately upon occurrence of another event and to connect it with valve structure in such relationship that preliminary movement of said device to an arresting point will connect both sides of a power cylinder controlled by said valve to the lower pressure side of a fluid pressure source and the occurrence of said another event, as further movement of a main transmission, will automatically effect further movement of said valve actuator and consequent automatic further movement of said controlling valve, whereby to effect a final action, as to conduct pressure to a selected side of an auxiliary transmission actuating device.

A further object of this invention is the provision of an actuating device, as aforesaid, which is small in size, which is relatively simple to fabricate and operate, particularly in view of the mechanisms presently in use for the same purposes, which has a minimum of moving parts housed substantially within a single small housing and which is easy to replace and/or repair if and when such is required.

Other objects and purposes of this invention will become apparent to persons familiar with this type of equipment upon reading the following specification and examining the accompanying drawings in which:

Figure 3 is a sectional view taken along the line III—III of Figure 2.

Figure 4 is a sectional view taken along the line IV—IV of Figure 2.

Figure 7 is a sectional view taken along the line VII—VII of Figure 3 with the operating parts thereof in another position.

Figure 1:
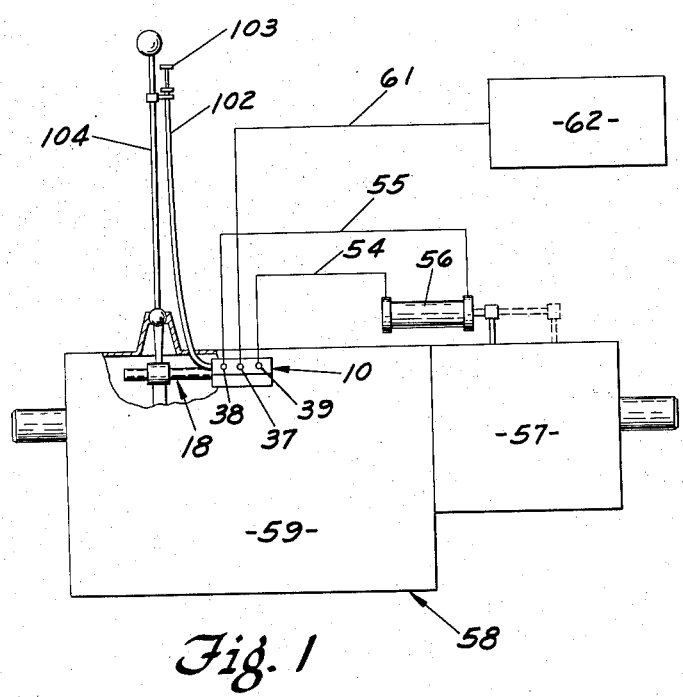
Figure 1 is a schematic view of apparatus illustrating and embodying our invention.

In meeting the objects and purposes set forth hereinabove, as well as others related thereto, we have provided in this particular embodiment a housing 10 (Figure 3), a piston type valve 12 and a preselected device 11 for actuating said valve. Said actuating device, which is disposed within the actuating chamber 13 in the housing 10, is comprised of a reciprocable member 14 slidably disposed in said chamber 13 (Figures 3 and 4) and including means connectable to the valve 12, said member being urged in one direction or the other by a resistively compressible toggle 15 pivotally engaging said reciprocable member and also disposed within the chamber 13. A lost motion bar 16 is slidably mounted upon the reciprocable member 14 for movement in substantially the same direction as and relative to said member 14. A blocking element 17 is selectably extendable into the chamber 13 for intercepting the lost motion bar 16 and thereby controlling the movement of the reciprocable member 14. The blocking element 17 may be the outer, extended end of a control mechanism, not shown, operable with and by the shift mechanism 18 (Figure 1) of a substantially conventional transmission. Such a control mechanism is disclosed and described in the co-pending application Serial No. 484,892, filed January 31, 1955, concurrently herewith and entitled "Shift Actuated Control Device."

For convenience in description, the terms "upper," "lower," "left," "right" and derivatives thereof as used herein have reference to the actuating device 11 and parts associated therewith as appearing in Figures 1, 4, 5 and 6. The terms "front," "rear" and derivatives thereof have reference to the left and right sides respectively, of the actuating device 11 and parts associated therewith as appearing in Figure 2. The terms "inner," "outer" and derivatives thereof have reference to the geometric center of said actuating device and parts associated therewith.

*Detailed construction*

The actuating device 11, to which this invention primarily relates, is disposed within the actuating chamber 13 (Figures 3 and 4) of a housing 10 having left and right end walls 21 and 22, respectively, an upper wall 23, a lower wall 24, a front wall 26 and a preferably removable rear wall 25. A partition 27 which is substantially parallel with the rear wall 25, separates the actuating chamber 13 from the valve chamber 28.

The valve chamber 28, in this particular embodiment, has a cylindrical bore extending through both ends 21 and 22 of the housing 10 and said bore is parallel with said rear wall 25. A passageway 29 communicates between the actuating chamber 13 and the valve chamber 28 near the rightward end of both. A pair of screens 31 and 32, or similar devices, may be mounted in exhaust ports 98 and 99 in the end walls 21 and 22 to prevent the entry of foreign materials into the valve chamber 28 while permitting fluid passage therethrough. A pair of cylindrical, spaced, valve chamber liners 33 and 34 having co-axial, cylindrical valve piston openings 35 and 36, respectively, are rigidly disposed within the valve chamber 28 between the passageway 29 and the leftward end of said chamber 28. An inlet port 37 extends through the front wall 26 of the housing 10 and communicates with the valve chamber 28 between the valve liners 33 and 34. A pair of outlet ports 38 and 39, which are parallel with and disposed on opposite sides of the inlet port 37, are provided in the front wall 26 of the housing 10 to communicate with substantially co-axial outlet openings 41 and 42, respectively, through the side walls of the valve liners 33 and 34. A pair of annular packing elements 43 and 44 are disposed in appropriate, annular grooves 45 and 46 in the inner walls of the valve liners 33 and 34 on opposite sides of the outlet openings 41 and 42.

Figure 8:
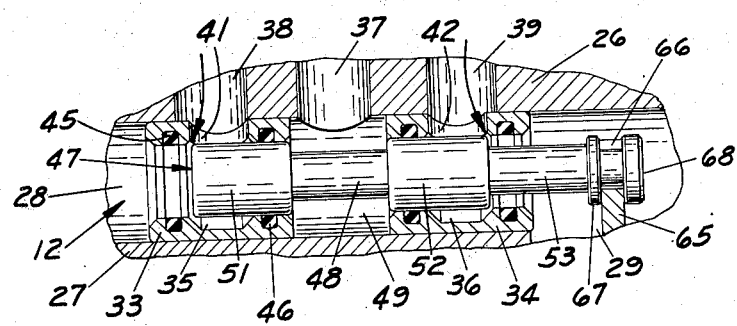
Figure 8 is a fragment of Figure 3 showing the valve piston thereof in a different position.

A valve piston 47, having two spaced, co-axial sealing barrels 51 and 52, is slidably disposed within the piston openings 35 and 36, said barrels being snugly embraceable by the packing elements 43 and 44. The barrels 51 and 52 are connected by a rod 48 which is substantially smaller in diameter than the sealing elements 43 and 44 and the piston openings 35 and 36. The length of said rod 48 is preferably such that fluid passing through the inlet port 37 into the center section 49 of the valve chamber 28, between the valve liners 33 and 34, cannot escape through both of the outlet ports 38 and 39 at the same time (Figure 3) but both outlet ports can be blocked simultaneously from said center section 49 by the barrels 51 and 52 (Figure 8). At the same time, the overall length of said rod 48 and barrels 51 and 52 must be such that when the valve piston 47 is in the neutral position, as shown in Figure 8, fluid can exhaust from the cylinder 56 simultaneously through both outlet ports 38 and 39 and through the exhaust ports 98 and 99 in the leftward and rightward ends, respectively, of the valve chamber 28. A co-axial valve stem 53 extends from and is secured to, the right end of the valve piston 47 above the passageway 29.

The outlet ports 38 and 39 (Figure 1) may be connected, for example, by conventional conduits 54 and 55 to the retraction and extension ends, respectively, of an actuating cylinder 56 utilized to shift the auxiliary box 57 of a transmission 58 having a shift mechanism 18. The inlet port 37 (Figure 1) may be connected by any convenient conduit 61 to a source 62 of fluid, such as air, under positive pressure.

The actuating chamber 13 (Figures 3 and 4) is preferably elongated and has a planar upper wall 63 which is parallel with the axis of the chamber 28. The reciprocable member 14 is comprised of an elongated, rectangular, actuating bar 64 slidably disposed against, and parallel with, said upper wall 63. A connector arm 65 is secured by a bolt 69 (Figure 7) to the right end of the bar 64 and extends laterally therefrom through the passageway 29 where its bifurcated end 66 (Figure 2) releasably embraces the stem 53 of the piston 47. A pair of annular flanges 67 and 68 (Figure 3) on the valve stem 53 embrace the opposite sides of the connector arm 65. Thus, any longitudinal movement of the bar 64 within the actuating chamber 13 is translated by the connector arm 65 into corresponding longitudinal movement of the piston 47.

The overall length of said reciprocable member 14 includes the slide bar 64, connector arm 65 and said bolt 69, which length is preferably shorter than the length of the chamber 13 by an amount substantially equal to the maximum desired axial movement of the valve piston. Thus, the end walls 21 and 22 of the housing 10, which also provide the end walls for the chamber 13, provide positive limits from the longitudinal movement of the reciprocable member 14 hence for the longitudinal movement of the piston 47. When the reciprocable member 14 is in the solid line position of Figure 4, the piston 47 is in the Figure 3 position; and when the reciprocable member is in the Figure 6 or Figure 7 position, the piston is in the Figure 8 position.

Figure 6:
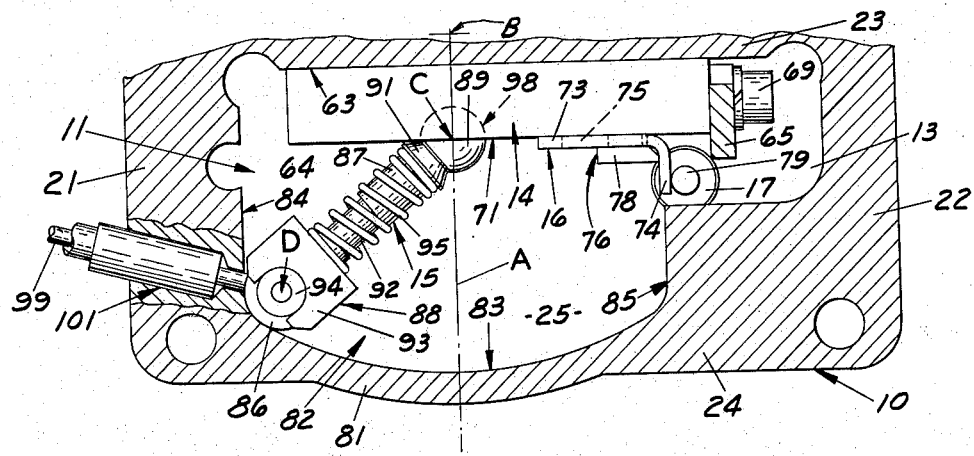
Figure 6 is a sectional view also similar to that shown in Figure 4 with operating parts thereof in another position.
Figure 5:
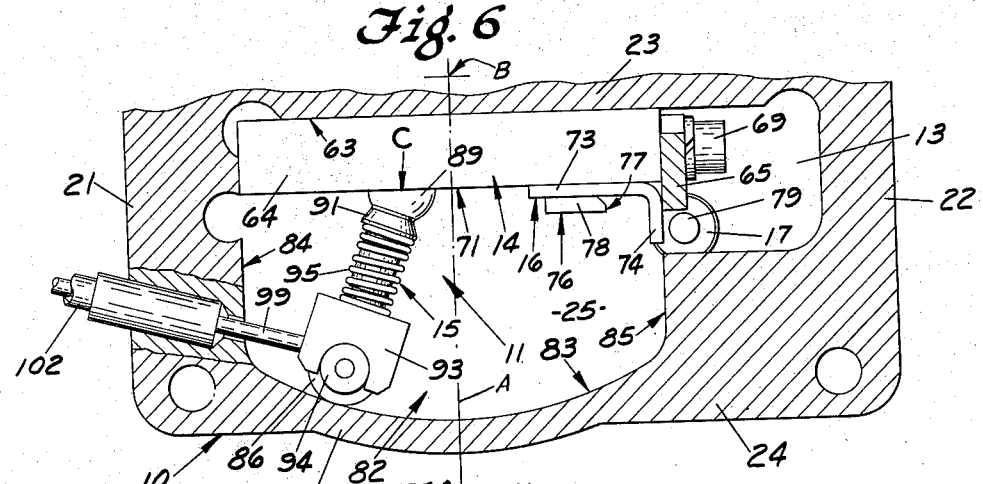
Figure 5 is a sectional view similar to that shown in Figure 4 with the operating parts thereof in a different position.

As shown in Figures 4, 5 and 6, the connector arm 65 also extends downwardly a short distance away from the lower side 71 of the actuating bar 64. An L-shaped lost motion bar 16 having a slide leg 73 and a blocking leg 74 is provided with an elongated, lengthwise opening 75 in said slide leg 73. A slide bolt 76 (Figure 7) extends through the slide opening 75 and is fixedly received into a suitable opening in the actuating bar 64 for slidably supporting the lost motion bar 16 upon the lower side 71 of the actuating bar 64. As shown in Figure 3, the housing rear wall 25 and the partition 27 cooperate with the bolt head 78 and actuating bar 64 to restrict movement of the lost motion bar 16 to movement parallel with that of the actuating bar. Further, since the blocking leg 74, at one end of its movement, will engage the connector 65 and, at the other end of its movement, will engage the edge 77 of the slide bolt head 78, the extent of movement of the lost motion bar 16 is further limited to the distance between the connector arm 65 (Figure 4) and the adjacent edge 77 of the slide bolt head 78, less the thickness of the leg 74. In this particular embodiment, this distance is equal to slightly less than half the full longitudinal stroke distance of the reciprocable member 14 the distance under half being sufficient to provide clearance, as at 80, between the blocking leg 74 and the blocking element 17 when leg 74 is at either extreme end of its movement (Figure 4).

Figure 2:
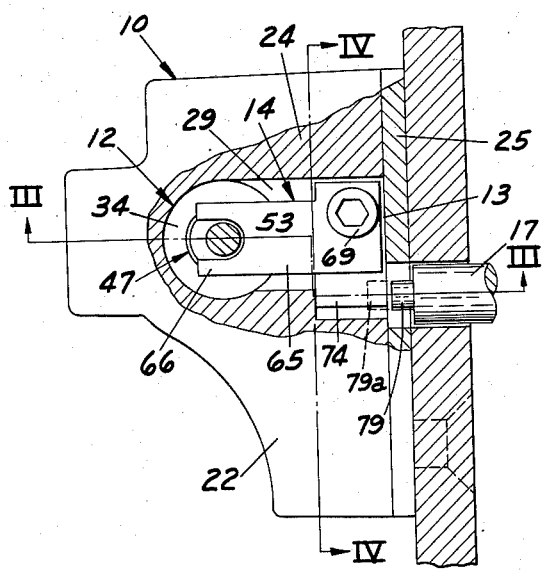
Figure 2 is a partially broken, rightward end elevation view of the invention in combination with a piston type valve.

The blocking element 17 (Figures 2 and 3) may be comprised of a rod having a co-axial blocking pin 79 which is extendable into the actuating chamber 13 through the rear wall 25 of the housing 10 by any convenient means, such as that disclosed in the above-mentioned co-pending application entitled "Shift Actuated Control Device." As shown in Figure 6, the axis of the blocking element 17 is so located with respect to the reciprocable member 14 that it can be engaged by either side of the blocking leg 74 of the lost motion bar 16 depending upon the direction of movement of the actuating bar 64 prior to the extension of said pin 79 into the chamber 13, as appearing in broken lines at 79a in Figure 2. To obtain the simultaneous unloading of the pressure fluid in the cylinder 56 during both the forward and return movement of the member 14, it is necessary that when the blocking leg 74 is engaged by said pin 79 the reciprocable member 14, hence the piston 47, is mid-way between the ends of its stroke (Figures 6 and 7) regardless of which direction the bar 65 is being urged. This means, in substance, that the distance between the pin 79 and the edge 77, when member 14 is in its leftward, solid-line position (Figure 4), is equal to the distance between pin 79 and arm 65 when member 14 is in its broken-line position 14a (Figure 4). Furthermore, these equal distances are each equal to half the total stroke of member 14 plus the thickness of the blocking leg 74. Likewise, the distance between said edge 77 and said arm 65 is necessarily less than said equal distances in order to insure no interference between the pin 79 and the blocking leg 74 during extension of said pin into the chamber 13, which occurs when the reciprocable member 14 is at one end or the other of its full stroke.

It is advantageous that the blocking leg 74 be engaged by the bolt edge 77, as shown in Figure 6, before the shank of the bolt 76 engages the right end of the slide opening 75. This produces a shorter torque arm along the leg 74 between the bolt 76 and the blocking pin 79 and thereby nearly eliminates the shock and large bending moment which would otherwise be imposed upon the slide leg 73 of the lost motion bar 16.

The lower wall 81 of the actuating chamber 13, which is defined by the upper surface of the housing lower wall 24, defines a recess 82 which extends from the leftward end of said chamber 13 toward the other end thereof a distance approximately equal to the length of the actuating bar 64. It will be recognized that this distance may be varied substantially within the scope of this invention. The inner or lower wall 83 (Figure 4) of the recess 82, opposed to the lower side 71 of the actuating bar 64 is in this embodiment, but not necessarily, uniformly arcuate and concave. In this particular embodiment, the lower wall 83 is a portion of a cylinder whose axis "B" lies withing a plane "A" parallel with, and mid-way between, the end walls 84 and 85 of said recess 82. Said axis "B" is also preferably disposed perpendicular to the rear wall 25 and above the actuating bar 64 for reasons appearing hereinafter.

A guide 86, which may be a roller, is located within the recess 82 for following the lower wall 83 (Figures 4, 5 and 6), the axis "D" of said roller being parallel with said axis "B." The toggle member 15 extends between, and is pivotally engaged by, both the roller 86 and the actuating bar 64. The toggle member 15 is comprised of two slidably telescoped elements 87 and 88. The upper element 87 has a spherical knob 89 at its upper end and a co-axial cylindrical opening 90 in its other end with an annular flange 91 between its ends. The lower element 88 has a stem 92 at its upper end slidably receivable into said opening 90 and a bifurcated bearing bracket 93 at the lower end thereof. The bearing bracket 93 extends around, and engages, the shaft 94 of the guide 86. A spring 95 encircles telescoped portions of the elements 87 and 88 and is held under compression between the flanges 91 and the bearing brackets 93, preferably at all times. The knob 89 is removably seated in a semi-spherical recess 98 in the lower side 71 of the actuating bar. The center "C" of said recess 98 is preferably located in a plane defined by said lower side 71. Said center "C" preferably moves from a position on one side of the plane "A" to a position on, and about equidistant therefrom on the other side thereof during a full stroke of the actuating bar 64. Dislodgement of the knob 89 from the recess 98 cannot occur so long as the spring 95 remains under some compression and the toggle member 15 is at an angle with the lower side 71 of the bar at all times.

Means such as a cable 99 (Figure 4) is secured to the guide 86 in any convenient, conventional manner for effecting movement of said guide 86 along the wall 83. The pivoting of the guide 86 on its shaft 94 permits the cable 99 to remain substantially straight in all positions of the device. The other end of said cable 99 may extend through an appropriate, bushed opening 101 in either end wall of the housing 10 and thence through a conduit 102 to a remotely located, toggle control 103, which may be mounted upon the shift lever 104 of said transmission 59. However, it will be recognized that reference to the transmission and shift lever thereof is made for illustrative purposes only, and is not intended to limit the application or utility of the invention.

With the axis "B" of the arcuate lower wall 83 disposed above the actuating bar 64, the toggle member 15 will, when moving leftwardly, reach a position (Figure 5) where the spring 95 surrounding same is under maximum compression. At this point the axis "D" of the roller 86 is spaced from the end wall 84 of the recess 82, and is aligned with the center "C" and the axis "B." Further leftward movement of said roller permits expansion of the spring 95 and thereby prevents accidental rightward movement of the roller from the left end of the recess 82 when preselectably placed thereat. It will be noted that this result is reached even though the bar 64 is at the left end of its stroke. If the structure is modified by moving the axis "B" toward the wall 83, then the position of maximum compression, that is, the Figure 5 position, will move leftwardly until eventually it becomes coincident with the position of the parts shown in Figure 6. At that point the self-locking arrangement is destroyed.

*Operation*

In describing the operation of the actuating device 11 disposed in the actuating chamber 13, reference is first made to Figure 4 which illustrates in solid lines said device 11 in one of two terminal positions which it may occupy at the beginning or termination of an operating cycle. The other terminal position is illustrated by a combination of the roller position shown in Figure 6 and the position of the reciprocable member 14 shown in Figure 4 by broken lines at 14a.

Starting with the actuating device 11 in the solid line position of Figure 4, it will be apparent that the blocking pin 79 of the blocking element 17 must be in its broken line, extended position 79a of Figure 2 to conduct the full operation of the actuating device. Otherwise, a shifting of the toggle member 15, as by moving the control 103, from the Figure 4 position to the Figure 6 position or the reverse, will immediately effect a complete stroke of the reciprocable member 14. The movement of the blocking pin 79 into its broken line position 79a (Figure 2) may be effected in any convenient manner in response to some outside, predeterminable operation, such as the shifting of a shift mechanism 18 in a conventional transmission 58 (Figure 1). As mentioned above, conversion of the shifting of the shift mechanism 18 into a movement of the blocking pin 79 may be carried out by a device such as that illustrated in my co-pending application entitled "Shift Actuated Control Device," filed concurrently herewith.

With the blocking pin 79 in the extended position 79a (Figure 2) and the lost motion bar 16 in its extreme rightward position on the actuating bar 64, the actuating device 11 is ready for preselection by operation, usually manually, of the plunger 103 from its solid line position to its broken line position (Figure 4) which, operating through the cable 99, effects a movement of the guide 86, hence the lower end of the toggle member 15, from the position thereof shown in Figure 4 to the terminal position thereof shown in Figure 6. During this movement, the toggle 15 passes through the maximum compression position shown in Figure 5, after which said toggle is materially aided in its continued leftward movement by said spring 95 and effectively locked thereby in the leftward, terminal position (Figure 6) against the wall 84.

At some position of the toggle member 15, after the guide axis "D" (Figure 4) passes through the plane "A," the spring 95 will impose a sufficiently strong, rightwardly directed force upon the actuating bar 64 to move said bar 64 rightwardly into the intermediate position shown in Figure 6. At the same time the lost motion bar 16 is moved to its extreme leftward position on actuating bar 64 because its movement is blocked by pin 79 so that it cannot move with bar 64. Here the blocking leg 74 is engaged on one side by the bolt edge 77 and on its other side by the blocking pin 79 thereby preventing further rightward movement of the actuating bar 64, hence of the reciprocable member 14 of which it is a part. In this (Figure 6) position the spring 95 is still under substantial compression between the flange 91 and the bearing bracket 93 on the upper and lower toggle elements 87 and 88, respectively. The reciprocable member will remain in this position indefinitely unless the toggle is shifted back into its Figure 4 position by the control 103, or the pin 79 is retracted from the chamber 13. This position of the actuator may advantageously place the associated valve piston 47 in an intermediate position, illustrated in Figure 8, so that both ends of the power cylinder 56 may be connected to the atmosphere to thereby unload the pressure fluid from both sides of the piston therein. In this way, subsequent introduction of pressure fluid to one end or the other of said power cylinder will effect a rapid action thereof and a consequent smooth shift of the transmission mechanism.

Immediately upon retraction of the blocking element 17 the blocking pin 79 will be moved out of its broken line position within the actuating chamber 13 (Figure 2), thereby no longer obstructing the path of the blocking leg 74. Thus, the reciprocable member 14 is now free to move rightwardly under the urging of spring 95 until its rightward end takes up the broken line position 14a shown in Figure 4 against the right end wall 22 of the housing 10. In this position of the reciprocable member 14, the valve structure 47 occupies its full rightward position and the pressure fluid from the source 62 is conducted through the conduit 54 to the leftward end of the cylinder 56 and effects a shift of the auxiliary transmission 57 in a down shift direction. Such shift follows immediately upon the attainment by the main transmission 59 of such a predetermined position as to effect the withdrawal of the pin 79.

With the reciprocable member 14 now in its broken line position 14a (Figure 4), another reverse cycle of operation is commenced by extending the pin 79 into the chamber 13 and moving the reciprocable member 14 into its other intermediate position, shown in Figure 7, by operation of the control 103 (Figure 4) from its broken line position to its solid line position. Again the valve 47 is moved into a position (Figure 8) for connecting both sides of the power cylinder 56 to the atmosphere and pressure is thereby relieved therefrom during the movement of member 14 to its intermediate position, the lost motion bar 16 will not move because its movement is blocked by pin 79. Thus, when member 14 is in its intermediate position, bar 16 is at its extreme rightward position on actuating bar 64 contacting arm 65.

Retraction of the blocking pin 79 from within the actuating chamber 13 upon the next attainment of said predetermined position by the main transmission will release said pin from the blocking leg 74 thereby permitting the compressed spring 95 of the toggle member 15 to urge the reciprocable member 14 into its leftward, solid line position shown in Figure 4 and thereby introduce pressure fluid into the opposite end of the power cylinder 56. This completes the reverse cycle of operation of the actuating device 11. By thus permitting an initial, limited, motion of the reciprocable member 14, and corresponding initial, limited, motion of the valve piston 47, it becomes possible upon preselection of the shift mechanism to connect both sides of the power cylinder 56 with the atmosphere prior to introducing shift-effecting pressure into said power cylinder. This has been established by ample experimental work as providing a much smoother shift than is possible where the power cylinder is not first so rendered atmospheric. While the blocking element 17 and the pin 79 thereon are here axially reciprocated into and out of the actuating chamber 13 by a control mechanism such as that disclosed in the co-pending application entitled "Shift Actuated Control Device," which is operated by said shift mechanism 18, it will be apparent that other types of mechanisms may be provided for effecting movement of the blocking element 17 in response to movements of the shift mechanism 18.

Modifications of the specific embodiment here shown may include devices wherein the axis "B" of the arcuate wall 83 (Figure 4) is shifted to the left or right of the plane "A" without materially detracting from the operation of the device, provided that such change in design does not eliminate the self-locking feature of the toggle member 15 in either of its preselected positions. The same limitations apply to upward and downward movement of the axis "B," from its illustrated position. Further, it is obvious from the disclosure herein that some of the objects of the invention could be attained by providing other means for holding the toggle member 15 in its left and right, preselected positions. Other similar variations and modifications will be apparent to those familiar with this type of equipment in adapting same to varying requirements of the same or similar type.

Therefore, although the above description discloses one particular form of the invention for illustrative purposes, it will be understood that variations or modifications thereof which lie within the scope of such disclosure are fully contemplated unless specifically stated to the contrary in the appended claims.

We claim:

1. In valve actuating mechanism, the combination comprising: a reciprocable member adapted for actuating a valve; a lost motion member movable relative to said reciprocable member; a blocking member extendable into the path of said lost motion element, engagement between said lost motion member and said blocking member permitting only a limited further movement of said reciprocable member; means for applying a mechanical pressure urging said reciprocable member in a selected direction along its path of reciprocation; whereby said reciprocable member will follow its said path under such urging to a limit permitted by said engagement of said blocking element and said lost motion member, and when said blocking element is retracted, will automatically complete its stroke.

2. A preselectable, automatic actuating device comprising: a reciprocable member and means guiding the path and limiting the distance of movement thereof; a lost motion bar slidably mounted upon said member for relative movement with respect to said member; a blocking element selectively engageable with said bar to limit movement of said member to a distance less than the maximum possible distance of movement thereof in one direction; a resilient member engaging said reciprocable member for moving same; and control means for shifting said resilient member to urge said reciprocable member in one direction and then in the other; said resilient member being distorted when said movement of said reciprocable member is limited by said element; whereby with said blocking element in position to engage said lost motion bar, the control means can actuate said resilient member for urging said reciprocable member in one direction of its reciprocation and said reciprocable member can move in such direction so far as permitted by the engagement of said blocking member against said lost motion bar and upon removal of said blocking member from blocking position, said reciprocable member will then automatically travel the rest of a distance under the urging of said resilient member constituting its normal path of reciprocation.

3. A preselectable, automatic actuating device comprising: means defining a chamber; a reciprocable member slidably movable within said chamber; a lost motion bar slidably mounted upon said member for relative movement with respect to said member; a blocking element selectively engageable with said bar to limit movement of said member to a distance less than the maximum possible distance of movement thereof in one direction, a resistively compressible toggle engaging said member for moving same; and control means for shifting said toggle to urge said member in one direction and then in the other, said toggle being compressed when said movement of said member is limited by said element.

4. A preselectable, automatic valve actuator comprising: means defining a chamber having a side wall; a reciprocable member slidably disposed in said chamber opposite said wall for movement in a direction substantially parallel with said wall, said member being connectable to said valve; a lost motion bar slidably mounted upon said member for relative movement with respect to said member; a blocking element selectively engageable with said bar to limit movement of said member to a distance less than the maximum possible distance of movement thereof in one direction; a resistively compressible toggle pivotally mounted at one end upon said member and having guide means at its other end continuously engageable with said wall for movement substantially in said direction, said toggle being compressed when said movement of said member is limited by said element.

5. A preselectable, automatic valve actuator comprising: means defining a chamber having a side wall; a reciprocable member slidably disposed in said chamber opposite said wall for movement in a direction substantially parallel with said wall, said member being connectable to said valve; a lost motion bar slidably mounted upon said member for relative movement with respect to said member; a blocking element selectively engageable with said bar to limit movement of said member to a distance less than the maximum possible distance of movement thereof in one direction; a resistively compressible toggle pivotally mounted at one end upon said member and having guide means at its other end continuously engageable with said wall for movement substantially in said direction; and remotely controllable means for effecting said movement of said guide, hence movement of said toggle, along said wall, said toggle being compressed when said movement of said member is limited by said element.

6. A preselectable, automatic actuating device comprising: means defining a chamber having a track along one wall thereof; a reciprocable member slidably disposed in said chamber opposite said track for movement in a direction substantially parallel with said track; a lost motion bar slidably mounted upon said member for relative movement with respect to said member; a blocking element selectively engageable with said bar to limit movement of said member to a distance less than the maximum possible distance of movement thereof in one direction; a guide within said track and remotely controllable means for moving same along said track; a longitudinally compressible toggle pivotally and continuously engaged at its opposite ends by said member and said guide; resilient means resisting compression of said toggle and thereby urging said member in said direction when said guide is near the opposite end of said track.

7. A preselectable, automatic actuating device comprising: means defining a chamber having a uniformly curved, concave track in one wall thereof; a reciprocable member slidably disposed in said chamber opposite said track for movement in a direction substantially parallel with a line connecting the ends of said track; a lost motion bar slidably mounted upon said member for relative movement with respect to said member; a blocking element selectively engageable with said member to limit movement of said member to a distance less than the maximum possible distance of movement thereof in one direction; a guide within said track and remotely controllable means for moving same along said track; a longitudinally compressible toggle pivotally and continuously engaged at its opposite ends by said member and said guide; resilient means resisting compression of said toggle and thereby urging said member in said direction when said guide is near the opposite end of said track.

8. A preselectable, automatic device for actuating a piston valve in a housing having an intake port midway between a pair of outlet ports, comprising: means defining a chamber in said housing adjacent to said piston; an elongated member parallel with the axis of said piston and slidably disposed within said chamber for lengthwise movement; means interconnecting said member and said piston; a lost motion bar slidably mounted upon said member for relative movement with respect to said member; a blocking element selectively engageable with said bar to limit movement of said member to a distance less than the maximum possible distance of movement thereof in one direction; a resistively compressible toggle engaging said member for moving same; control means for shifting said toggle to urge said member in the opposite direction, said toggle being compressed and both of said outlet ports being blocked by said piston when said movement of said member is limited by said element.

9. A valve actuating mechanism, comprising in combination: an actuating member connected to said valve and movable between two terminal positions; controllable means for selectively urging said actuating member from one of its terminal positions toward its other terminal position; a blocking element selectively extendable into the path of said actuating member for blocking movement of said actuating member intermediate its two terminal positions, said controllable means continuing to urge said actuating member toward said other terminal position when movement of said actuating member is blocked, whereby upon retraction of said blocking element, said actuating member will immediately move to its other terminal position.

10. The combination of claim 9 wherein said controllable means includes a pair of telescoping members; spring means connected to and acting upon said telescoping members, one of said telescoping members being pivotally mounted on said actuating member and the other of said telescoping members being movable with respect to said actuating member to a position where said spring means urges said telescoping members apart, thereby urging said actuating member toward said other terminal position.

11. An actuating mechanism for a valve, said valve having an elongated, longitudinally movable valve element, comprising in combination: an actuating member movable in a direction parallel with the direction of movement of said valve element and means connecting said actuating member to said valve element; a lost motion bar connected to said actuating member for movement relative thereto; a blocking element selectively engageable with said bar when said actuating member is intermediate its terminal positions, engagement between said element and said bar permitting only a limited further movement of said actuating member; a compressible toggle connected at one of its ends to said actuating member; means defining a track, the other end of said toggle riding on said track, said track being so shaped that said toggle is compressed to the maximum extent at a point intermediate its terminal positions, said toggle in its terminal positions being in a condition less than maximum compression; and control means for moving said toggle along said track.

12. The combination of claim 11 wherein said toggle is comprised of a pair of telescoping members.

13. An actuating mechanism for a valve, said valve having an elongated, longitudinally movable valve element, comprising in combination: a housing; means defining a chamber in said housing, said chamber having an elongated, planar wall and an arcuate wall opposed thereto; an actuating member movable along said planar wall in a direction parallel with the direction of movement of said valve element; a lost motion bar connected to said actuating member for movement relative thereto; a blocking element selectively engageable with said bar when said actuating member is intermediate its terminal positions, engagement between said blocking element and said bar permitting only a limited further movement of said actuating member; a compressible toggle connected at one of its ends to said actuating member for pivotal movement with respect thereto, the other end of said toggle riding on said arcuate wall, said arcuate wall being shaped so that said toggle is compressed to the maximum extent intermediate its terminal positions and is compressed to a lesser extent when in its terminal positions; and control means for moving said toggle along said arcuate wall.

14. The combination of claim 13 wherein said arcuate wall is of constant radius, the axis from which said radius extends lying on the other side of said planar wall from said arcuate wall.

15. The combination of claim 14 wherein said toggle member includes a pair of telescoping elements and a coil spring surrounding and energizing said telescoping elements; a roller mounted on the telescoping element adjacent said arcuate wall, said roller riding on said arcuate wall.

16. The combination of claim 15 wherein said control means includes a manually operable cable connected to said roller.

17. The combination of claim 15 wherein the telescoping member adjacent said planar wall has a spherical end, said end seating in a correspondingly shaped recess in said actuating member.

References Cited in the file of this patent

UNITED STATES PATENTS

| | | |
|---|---|---|
| 1,131,129 | Gordon | Mar. 9, 1915 |
| 2,236,032 | Helgeson | Mar. 25, 1941 |
| 2,548,678 | Obenour | Apr. 10, 1951 |